US010455973B2

(12) United States Patent
Dollner et al.

(10) Patent No.: US 10,455,973 B2
(45) Date of Patent: Oct. 29, 2019

(54) MILK-FROTHING DEVICE WITH DYNAMIC MIXING UNIT, AND BEVERAGE MAKER CONTAINING THE SAME

(71) Applicant: WMF Group GmbH, Geislingen/Steige (DE)

(72) Inventors: Sander Dollner, Neu-Ulm (DE); Thobias Kuchler, Ulm (DE); Jochen Gussmann, Schwäbisch-Gmünd (DE)

(73) Assignee: WMF GROUP GmbH, Geislingen/Steige (DE)

( * ) Notice: Subject to any disclaimer, the term of this patent is extended or adjusted under 35 U.S.C. 154(b) by 585 days.

(21) Appl. No.: 15/100,881

(22) PCT Filed: Dec. 1, 2014

(86) PCT No.: PCT/EP2014/076080
§ 371 (c)(1),
(2) Date: Sep. 2, 2016

(87) PCT Pub. No.: WO2015/082391
PCT Pub. Date: Jun. 11, 2015

(65) Prior Publication Data
US 2016/0367071 A1     Dec. 22, 2016

(30) Foreign Application Priority Data
Dec. 3, 2013   (DE) .................. 10 2013 224 786

(51) Int. Cl.
*A47J 31/44*  (2006.01)
*A47J 43/12*  (2006.01)
(Continued)

(52) U.S. Cl.
CPC ......... *A47J 31/4485* (2013.01); *A47J 43/121* (2013.01); *B01F 3/04453* (2013.01);
(Continued)

(58) Field of Classification Search
CPC .... A47J 31/4485; A47J 43/121; A47J 31/401; A47J 31/46; A47J 31/407; A47J 31/3633
(Continued)

(56) References Cited

U.S. PATENT DOCUMENTS 4,486,697 A * 12/1984 Diefenbach ............. H02K 7/06
                                                  318/703
2005/0079265 A1* 4/2005 Ufheil .................... A47J 31/401
                                                  426/569
(Continued)

FOREIGN PATENT DOCUMENTS

CN        1665434 A    9/2005
CN      101026982 A    8/2007
(Continued)

OTHER PUBLICATIONS

"International Application No. PCT/EP2014/076080, International Search Report dated Feb. 26, 2015", w/ English Translation, 7 pgs.
(Continued)

*Primary Examiner* — Phuong T Nguyen
(74) *Attorney, Agent, or Firm* — Schwegman Lundberg & Woessner, P.A.

(57) ABSTRACT

The invention relates to a milk-frothing device with a dynamic mixing unit having a stator and a rotor which can be set in rotation relative to the stator, rotor and stator being configured such that milk and air can be conducted firstly to the dynamic mixing unit, subsequently, for frothing-up in the dynamic mixing unit, can be subjected multiple times to a shearing effect by rotation of the rotor relative to the stator and finally can be discharged out of the dynamic mixing unit.

17 Claims, 7 Drawing Sheets

Figure 1:
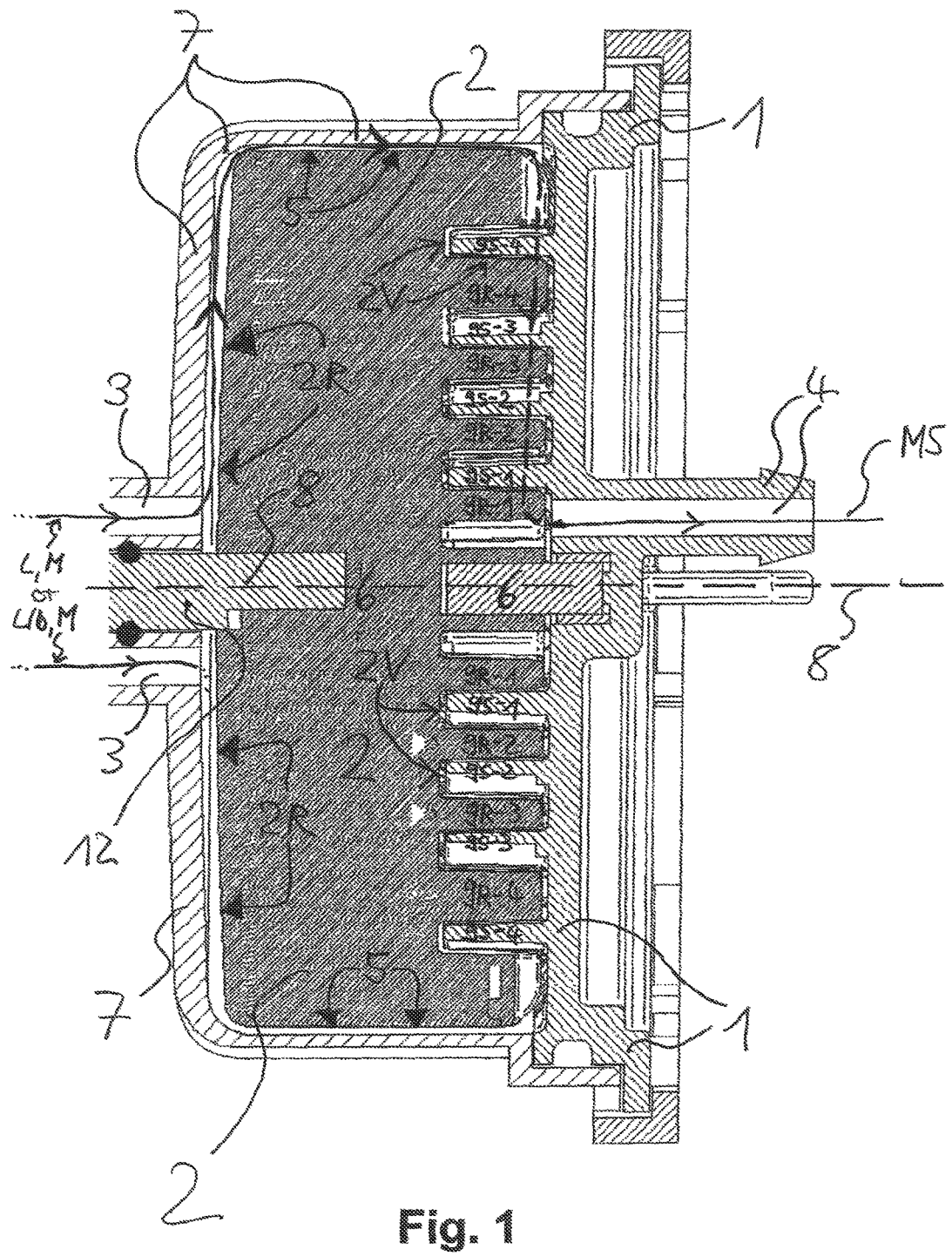

(51) Int. Cl.
*B01F 3/04* (2006.01)
*B01F 15/00* (2006.01)

(52) U.S. Cl.
CPC .... *B01F 3/04815* (2013.01); *B01F 15/00175* (2013.01); *B01F 15/00389* (2013.01); *B01F 15/00415* (2013.01); *B01F 15/00422* (2013.01); *B01F 15/00538* (2013.01); *B01F 2003/04872* (2013.01); *B01F 2003/04943* (2013.01); *B01F 2215/0006* (2013.01)

(58) Field of Classification Search
USPC ......... 99/290, 293, 295, 279, 280, 281, 283, 99/285, 287, 288, 300, 323, 453, 454
See application file for complete search history.

(56) References Cited

U.S. PATENT DOCUMENTS

2011/0158036 A1* 6/2011 Koopman ............. A47J 31/401
366/144
2012/0266755 A1* 10/2012 Baudet ................ A47J 31/3633
99/295

FOREIGN PATENT DOCUMENTS

| DE | 19719784 C1 | 7/1998 |
|---|---|---|
| EP | 1639924 A1 | 3/2006 |
| FR | 1538759 A | 9/1968 |
| JP | 2008514246 A | 5/2008 |
| JP | 2010273744 A | 12/2010 |
| WO | WO-9010411 A1 | 9/1990 |
| WO | WO-2015082391 | 6/2015 |

OTHER PUBLICATIONS

"International Application No. PCT/EP2014/076080, Written Opinion dated Feb. 26, 2015", w/ English Translation, 11 pgs.
"International Application No. PCT/EP2014/076080, International Preliminary Report on Patentability dated Jun. 15, 2016", w/ English Translation, (dated Jun. 15, 2016), 6 pgs.
"Chinese Application No. 201480066048.0, Office Action dated Jan. 8, 2018", w/ English Translation, (dated Jan. 8, 2018), 14 pgs.
"Japanese Application No. 2016-536521, Office Action dated Mar. 20, 2018", w/ English Translation, (dated Mar. 20, 2018), 8 pgs.

* cited by examiner

MILK-FROTHING DEVICE WITH DYNAMIC MIXING UNIT, AND BEVERAGE MAKER CONTAINING THE SAME

PRIORITY APPLICATIONS

This application is a U.S. National Stage Filing under 35 U.S.C. 371 from International Application No. PCT/EP2014/076080, filed on 1 Dec. 2014, and published as WO 2015/082391 on 11 Jun. 2015, which claims the benefit of priority to German Application No. 10 2013 224 786.9, filed on 3 Dec. 2013; which applications and publication are incorporated herein by reference in their entirety.

The present invention relates to a milk-frothing device with a dynamic mixing unit and also to a drinks preparer (in particular: electrically operated coffee machine, such as for example fully automatic coffee machine) which comprises such a milk-frothing device. The present invention relates, furthermore, to a corresponding milk-frothing method.

Modern coffee machines which also dispense milk or milk froth or also mixed drinks can also dispense cold milk or cold milk froth. In order to dispense milk or milk froth, alternatively cold or heated, complex systems are used: for example, there are devices for circumventing the heater (see for example EP 2 120 656 B1) or completely separated (double) paths for producing and dispensing cold or warm products (see for example EP 2 294 952 B1).

The great complexity, on the part of the system, is thereby disadvantageous. This therefore also has the result that, for frothing warm milk because of the significantly different viscosity, a substantially higher energy input is required for producing the same finely-pored and homogeneous froth quality than in the case of cold milk. One great disadvantage of the known systems is in particular the low flexibility since often high operating pressures are required (caused by very small apertures in the pipelines). This leads to the fact that components, such as pumps, flow heaters etc., can be used only within a very narrow range and have a mutual effect on each other. The result is hence correspondingly limited in variability.

Starting from the state of the art, it is therefore the object of the present invention to make available a milk-frothing device (and also a drinks preparer comprising this) which has great flexibility in the froth result. The device should thereby be able to produce different froth consistencies and to froth liquids (milk) of a very different temperature (i.e. viscosity). It is a further aim to minimise, as far as possible, the operating pressures in the system, the system being intended to be less susceptible to disruptions with respect to variations in the individual parameters (quantity of air, air pressure, quantity of milk, milk pressure, temperatures etc.).

This object is achieved by a milk-frothing device according to claim 1 and also by a drinks preparer according to claim 14. A milk-frothing method according to the invention is configured according to the functional features of claim. Advantageous variants can be deduced respectively from the dependent claims.

Subsequently, the present invention is described firstly in general, then in detail with reference to several embodiments. The features of the invention which are produced in combination with each other in the individual embodiments need not be produced, within the scope of the invention, as shown in the embodiments. Also other combinations of some of the illustrated features are possible within one embodiment or also feature combinations of individual features of different embodiments. Some of the illustrated features can also be omitted and, in particular, some of the illustrated features per se can in fact represent an improvement to the state of the art.

A milk-frothing device according to the invention is configured according to claim 1.

(Heated) steam can thereby be added to the air so that the air supplied to the dynamic mixing unit can be present in the form of an air-steam mixture (subsequently: L/D mixture). According to the invention, a separate supply of milk, on the one hand, and of air is possible (if production of cold milk froth is desired) or, on the other hand, an L/D mixture (if warm milk froth is intended to be produced) into the dynamic mixing unit (the dynamic mixing unit can therefore have a plurality of supply pipes). However, it is likewise possible to provide merely a single supply pipe to the dynamic mixing unit. In this case, the fluids to be mixed (milk and air or milk, air and steam) are brought together upstream of the supply pipe into the mixing unit.

The frothing of the milk (by air supply) hence takes place in a rotor-stator system (dynamic mixing unit) which can be formed in various ways. It is thereby essential that a first element (rotor) rotates, i.e. is moved, relative to a further element (stator). Milk and air are supplied to the mixing unit, this supply being able to be achieved, by one or more supply channel/supply channels leading into the mixing unit. Basically, also supply pipes can however be dispensed with if the milk and the air are introduced directly into the mixing unit.

According to the invention, rotor and stator cause a multiple shearing effect in the milk, as a result of which partial denaturation (structural change in the proteins) takes place. As a result, improved frothability of the milk is achieved.

First advantageously achievable features can be deduced from the dependent claim 2.

As an alternative thereto, it is also possible to guide milk and air close to the centre of the rotor (e.g. via an annular gap which extends, viewed in the direction of the axis of rotation, from the rear-side to the front-side of the rotor through the rotor body) from the rear-side of the rotor to the front-side of the rotor, to make the milk and the air flow radially outwards on the front-side of the rotor (by means of rotation thereof) (as a result of which multiple shearing likewise occurs at the shearing elements) and to discharge the milk and the air out of the dynamic mixing unit at the outer circumference of the front-side of the rotor (e.g. through a further annular gap which leads away from the front-side of the rotor and has a diameter which corresponds approximately to that of the rotor).

Further embodiments are conceivable (thus e.g. to configure the shearing structures of the rotor on the inflow rear-side—instead of the front-side—of the rotor and, correspondingly to configure the shearing structures of the stator on the inner wall of the stator situated opposite this rear-wall.

Further advantageously achievable features can be deduced from the dependent claim 3.

Supplying milk and air to the rear-side of the rotor can thereby be effected, at least in portions, parallel to the axis of rotation of the rotor (and thereby close to the centre or even radially at a spacing from the axis of rotation, i.e. between the centre of the rotor and the outer circumference of the rotor). As an alternative thereto, also inflow of air and milk radially from outside towards the centre (i.e. perpendicular to the axis of rotation of the rotor) or also tangentially to the rotor circumference is however possible. The same also applies for discharging the milk and the air (more precisely: the milk-froth mixture resulting from the frothing effected in the dynamic mixing unit) from the front-side of the rotor (i.e. out of the dynamic mixing unit).

Rotor, on the one hand, and stator and/or housing, on the other hand, can be configured connectably in multiple parts and via a bayonet socket (after producing the connection of the bayonet socket, the dynamic mixing unit is in general impermeable to fluids apart from the supply pipe(s) and discharge pipe(s)).

Further advantageously achievable features can be deduced from the dependent claim 4.

The individual shearing elements of a series of shearing elements can be projections, such as for example teeth, pins or similar elements. The shearing elements of one and the same series can (viewed radially outwards) be positioned at a constant spacing from the axis of rotation of the dynamic mixing unit or of the rotor and respectively at a spacing from each other, i.e. along a circle, on a surface of the rotor or of the stator which is orientated perpendicular to the axis of rotation, e.g. in the shape of a circular disc. The series of shearing elements of the rotor and those of the stator are therefore disposed, alternately, concentrically about the axis of rotation. Rotor and stator can thereby be essentially flat discs which are rotationally-symmetrical about the axis of rotation and carry respectively the shearing elements as protrusions or projections on the surfaces orientated towards each other.

Preferably, the width (i.e. the spacing) between a series of shearing elements of the stator and of the directly adjacent series of shearing elements of the rotor (and vice versa) is (in radial direction) between 0.1 mm and 0.5 min.

The axial spacing of a shearing element of the stator relative to the area of the rotor and/or the axial spacing of a shearing element of the rotor relative to the area of the stator (i.e. the gap/gaps between the end-sides of the shearing elements and the respectively opposite area, through which the milk can flow, without being forced to pass through a shearing and/or a direction reversal), can be between 0.1 and 3 mm, preferably between 0.1 and 0.5 mm (including the boundary values).

Viewed along a shearing element circle or a series of shearing elements, the width (i.e. the spacing) between two directly adjacent shearing elements of one series is preferably between 0.5 mm and 4 mm.

Further dimensions can be as follows: height of the shearing elements (extension of these elements in the direction of the axis of rotation) between 2 and 20 mm, preferably between 5 and 15 mm (preferably: 8 mm); axial spacing of the rotor rear-side relative to the housing between 0.5 and 10 mm, preferably between 1 and 3 mm (respectively including the boundary values).

Preferably, respectively between two and ten series of shearing elements are provided on the rotor and the stator (preferably: between two and five). The series of shearing elements of the rotor and of the stator engage therefore intermittently one in the other so that milk and air flowing between rotor and stator from outside to inside (i.e. towards the axis of rotation) are subjected to a shearing, because of the rotation of the rotor relative to the stator, respectively between two directly adjacent series of shearing elements (once of the rotor and once of the stator). As a result of this multiple shearing between shearing elements of adjacent series of shearing elements meeting at reducing relative speeds, viewed from outside to inside (because of the rotor rotating at a constant angular velocity), the result is not only thorough mixing of milk and air (or of milk and the L/D mixture) but also a partial denaturation of the milk, which leads to improved milk-froth quality and milk-froth stability.

Further advantageously achievable features can be deduced from the dependent claim 5.

The milk and air (or milk-air mixture) flowing alternately through the individual series of shearing elements of the rotor and of the stator and from outside to inside, i.e. towards the centre (axis of rotation), are, upon crossing from the through-openings of one series (for example of the stator) through the gap between two adjacent series into the through-openings of the directly adjacent series (for example of the rotor), not only respectively sheared but also subject respectively to a change of direction. As a result, the froth quality and froth stability can be further improved.

Further advantageously achievable features can be deduced from claim 6.

The double value of the indicated maximum radial extension produces the (average) diameter of the stator and/or of rotor perpendicular to the axis of rotation. The indicated range of the maximum radial extension thereby takes into account, on the one hand, that too small a radial extension would lead to too low a circumferential speed (and therefore to poorer thorough mixing and a poor froth quality (too coarsely-pored froth)) and/or to too high a speed of rotation, too high bearing stress and/or too high noise development (so that too high demands would be placed upon the mechanics and the drive) and, on the other hand, that too great a radial extension would make the dynamic mixing unit too large and heavy (since in particular the speeds of rotation of the rotor, cf. subsequently, necessitate a minimum stability of the dynamic mixing unit or of the rotor and stator). It is thereby important in particular that, for frothing by multiple shearing, the milk must flow from outside to inside (towards the centre of the rotor) over a specific minimum distance and must be sheared multiple times on the latter since the pores of the milk froth do not form immediately but must be kept in their shape after production thereof or must be relaxed "slowly" in order that the milk interfaces can stabilise around the air bubble and the froth hence becomes durable or stable. In addition, as a result of further shearing and thorough mixing, the bubble size is improved and the bubbles initially of a different size are homogenised in their dimension. Precisely this multiple shearing when moving inwards over a plurality of series of shearing elements leads to an optimised, stable froth quality with a desired, homogenous pore size, the average of which can be in particular in the range between approx. $\frac{1}{10}$ mm and 1 mm.

Further advantageously achievable features (which can be produced in particular in conjunction with the features mentioned in claim 6 in order to achieve optimum froth quality and stability) can be deduced from the dependent claim 7.

The drive of the rotor for achieving this speed of rotation can thereby be produced, as described in the dependent claim 8 or 9.

The rotor can be encapsulated within the housing (according to claims 3 and/or 9) or a housing. The encapsulation is advantageously configured to be impermeable to fluid. The stator and the housing can be identical, the stator can form part of the housing or the stator can be disposed within the housing. The configuration according to claim 8 has the advantage in particular that no sealing points need be present on the drive-side.

Further advantageously achievable features can be deduced from the dependent claims 10 and 11.

According to claim 11, efficient heating of the stator can be effected since, for this purpose, the surface enlarged (by the plurality of series with shearing elements) can be used.

Heating of the stator can however also be achieved via steam (or a heating fluid) which is conducted past outside. A further alternative for the heating is an inductively heatable stator. Also a direct electrical heating of the stator (or of the dynamic mixing unit) s possible.

Further advantageously achievable features can be deduced from claims 12 and 13.

The milk and/or milk froth temperature can thereby be controlled or regulated via the temperature of the steam. Alternatively or additionally, it is also possible to provide heating of the dynamic mixing unit, in particular of the stator thereof, and/or a flow heater for heating the milk and/or the milk froth. This also can be controlled by the control unit or regulated by the control and regulating unit.

The above-described, advantageously achievable features can be produced in any combinations of features with each other.

In the case of a milk-frothing method according to the invention, the rotor of a dynamic mixing unit is firstly set in rotation relative to the stator. Rotor and stator are thus configured (i.e. positioned in particular relative to each other) and are moved relative to each other such that the milk and air supplied to the dynamic mixing unit are frothed in the dynamic mixing unit by them flowing (e.g. from the outer circumference of the rotor to the centre of the rotor) in the dynamic mixing unit and, in the interim, being subjected multiple times to a shearing due to the rotation of the rotor relative to the stator (and because they flow preferably through the multiple series of shearing elements) before they are discharged from the dynamic mixing unit finally as milk froth.

A drinks preparer according to the invention is described in claim 14.

Hence, steam can be supplied upstream to the dynamic mixing unit in order to dispense the mixture (the milk froth) in a warm state. The steam supply can thereby be effected also directly into the mixing unit. In addition, also adding flavourings (e.g. in syrup form) into the dynamic mixing unit is possible or, for example, the addition of coffee or frothing of drinking chocolate or similar drinks.

By changing, for example, the speed of rotation of the rotor, the quantity of air (volume flow), the quantity of milk (volume flow) and/or steam temperature and/or quantity of steam or any combination thereof, the froth consistency can be adjusted, according to the invention, over a wide range (it being possible to react flexibly to influencing variables, such as for example the viscosity of the milk caused by the milk temperature).

The milk can be supplied to the dynamic mixing unit, for example by means of a pump. The dynamic mixing unit can also be disposed upstream of the pump so that the pump serves for additional froth improvement. Furthermore, the dynamic mixing unit can also be used for improving the froth which is produced by a standard venturi system, as is known to the person skilled in the art. Also heated milk can be supplied by a venturi system to the dynamic mixing unit (heating of the milk by means of steam without air supply in the venturi system), the already heated milk being able to be frothed up by the supply of air exclusively (i.e. without steam) in the dynamic mixing unit. The milk-frothing device can also comprise a flow heater for heating the frothed-up milk (i.e. downstream of the dynamic mixing unit). It is also possible to provide such a flow heater upstream of the dynamic mixing unit in order to heat the milk even before frothing thereof (or before the air supply). Any combinations of the above-described features are possible.

Relative to the milk-frothing devices known from the state of the art, the milk-frothing device according to the invention has the following advantages.

The input-side pressure can (compared with aperture systems which require more than 2 bar, partially up to 6 bar) be comparatively small, i.e. <2 bar (for example 600 to 700 mbar). Hence, the milk-frothing machine according to the invention need not operate at high pressure, therefore it permits a significantly wider variation range with respect to froth consistency and froth quality.

Since the individual parameters of the system (for example: speed of rotation of the rotor, supplied quantity of air, supplied quantity of milk, mixing degree between air and steam, . . . ) are in practice not mutually affected, the milk-frothing device according to the invention has a very high flexibility. Precisely also as a result of this flexibility, a homogeneous milk-froth formation is possible with the most varied of froth qualities.

The milk-frothing device according to the invention has a comparatively simple construction with few components. In the case of wear and tear or for reasons of hygiene, the components can easily be dismantled and hence exchanged (in particular if rotor and stator have been connected by means of a bayonet socket).

Because of the low system pressure, seals and closures can be designed such that components can be exchanged without tools and hence for example also by non-experts). The milk-frothing device according to the invention is hence particularly maintenance-friendly.

The comparatively simple construction also makes possible different constructions: thus a connection to a conveying element as part of the rotor is possible, which element can increase the pressure in the mixing unit (for example in combination with an outlet-side aperture). The conveying element can assume the function of a pre-connected pump, a further pump for milk conveyance being unnecessary. Different drive concepts are possible: thus for example a drive of the rotor equipped with magnetic elements (permanent magnets) via a rotating field (rotating field generator or motor with hollow shaft), so that no sealing points are necessary on the drive-side. Alternatively thereto, also a drive of the rotor via a motor-driven shaft is however possible.

In particular the already-described rear-side inflow on the rotor, the subsequent outwards flow of milk and air (due to the centrifugal forces of the rotor), the then following flow around the outer circumference of the rotor towards the front-side of the rotor and finally the throughflow of the front-side of the rotor (multiple shearing region) leads to a coercive flow around all regions of the dynamic mixing unit with fluid. This helps in particular also with the cleaning, in the case of which, instead of milk and air, a cleaning fluid is made to flow through the dynamic mixing unit. It is hence unnecessary for cleaning to take apart the dynamic mixing unit. The cleaning in the system is hence assisted by the mechanical rotation movement.

The device according to the invention allows a large range of different conveying capacities, a constant froth quality being possible despite different conveying capacities. In particular, also a simple heating function (via the inflowing steam) is possible by the invention, in the case of which the result is condensation of the steam in the flow region around the rotor outer circumference.

Subsequently, the invention is described in more detail with reference to embodiments. There are thereby shown:

FIG. 1 a first milk-frothing device according to the invention in a cross-section through the axis of rotation.

Figure 2A:
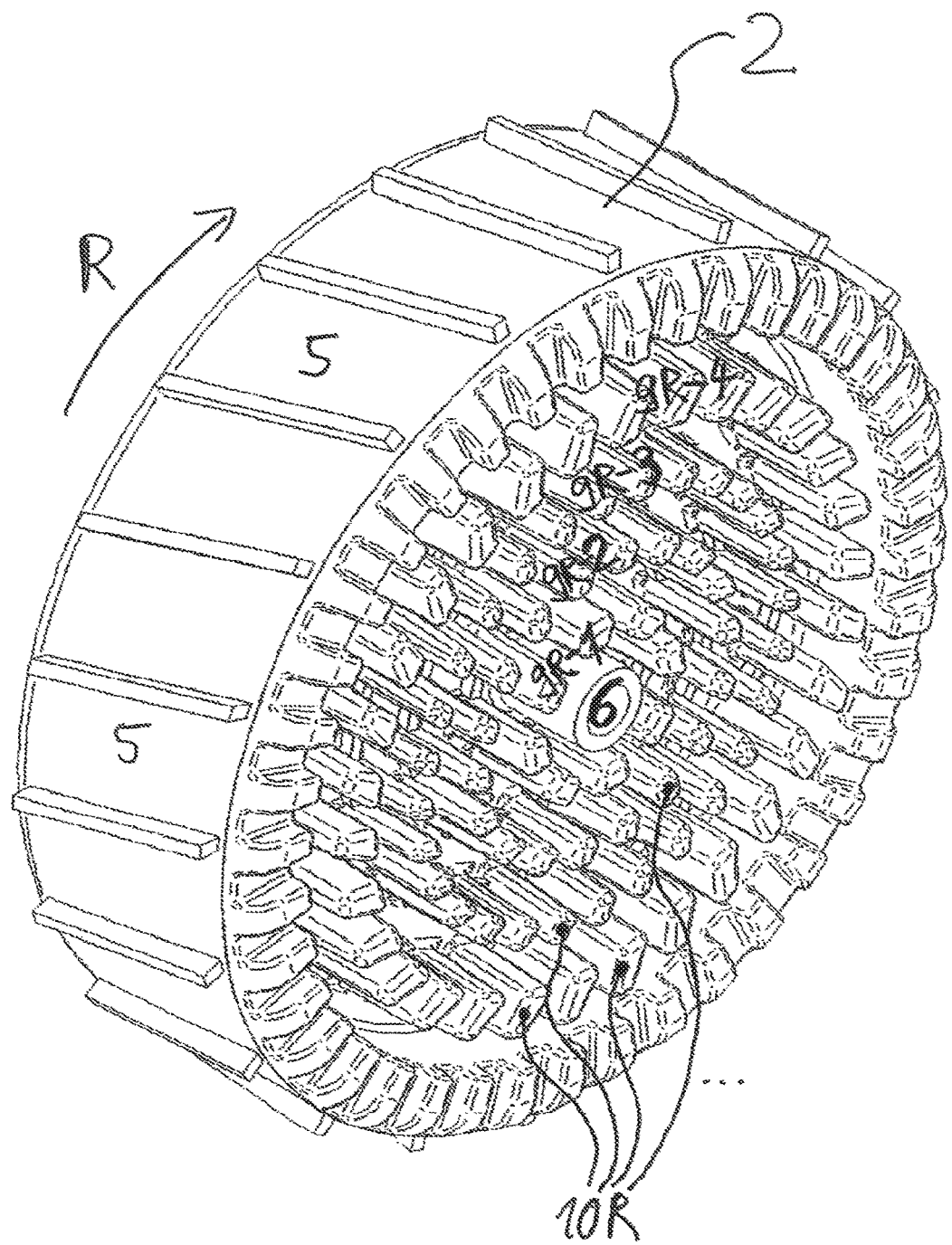
Figure 2B:
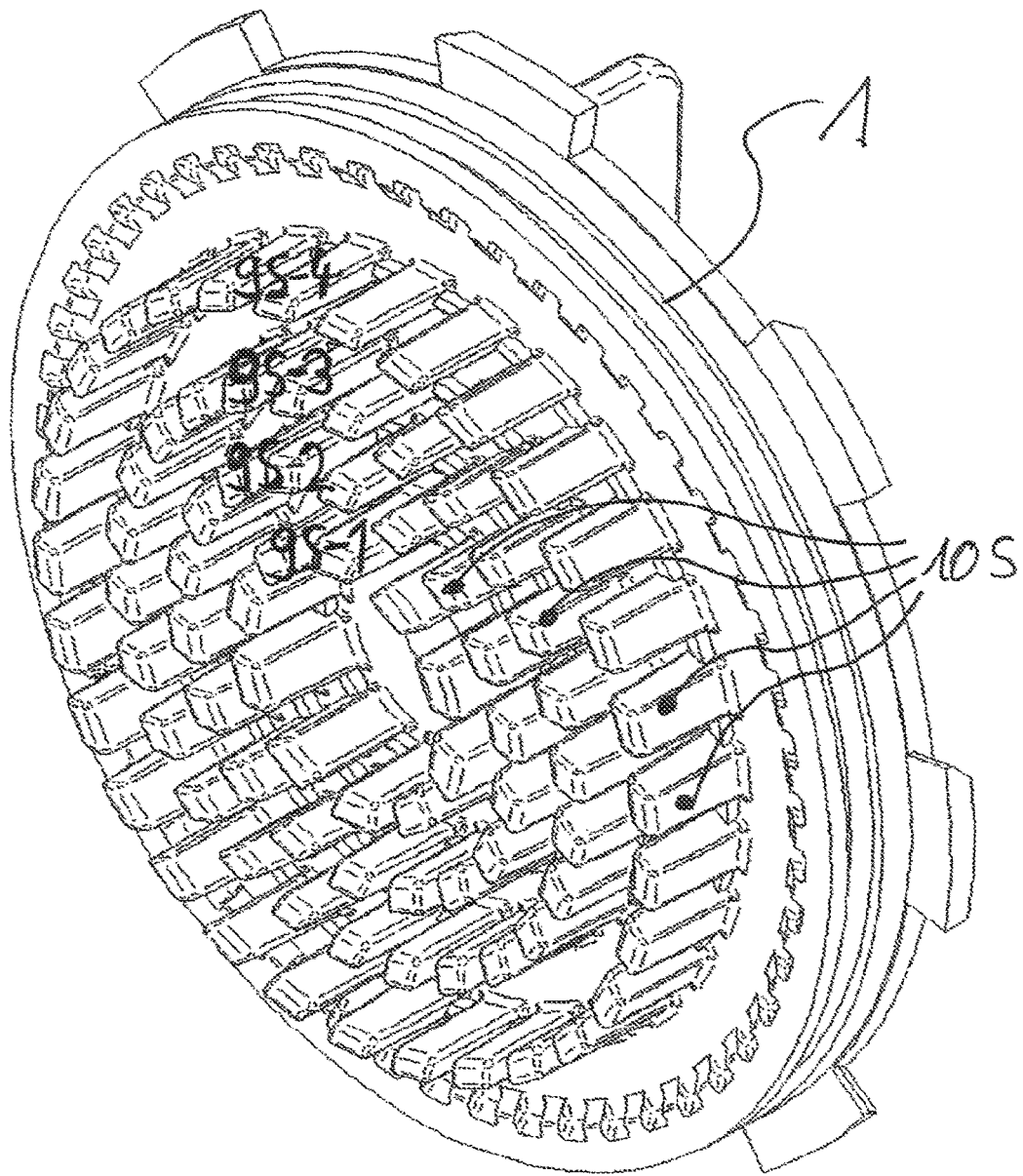

FIG. 2 a three-dimensional plan view onto the rotor (FIG. 2a) and the stator (FIG. 2b) according to FIG. 1.

Figure 3:
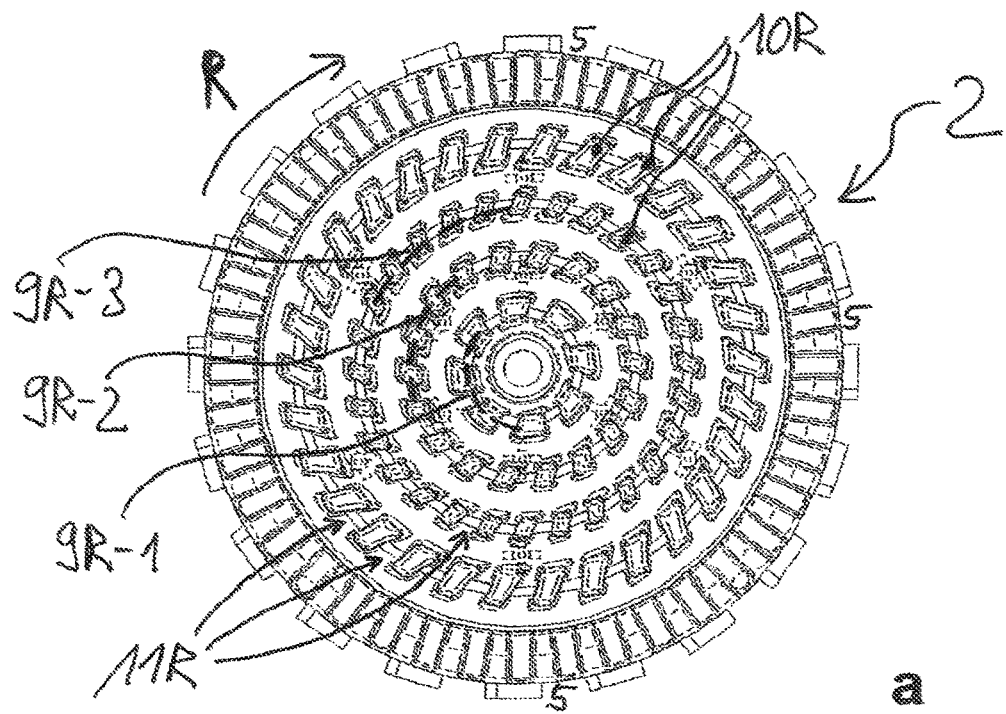
Figure 3:
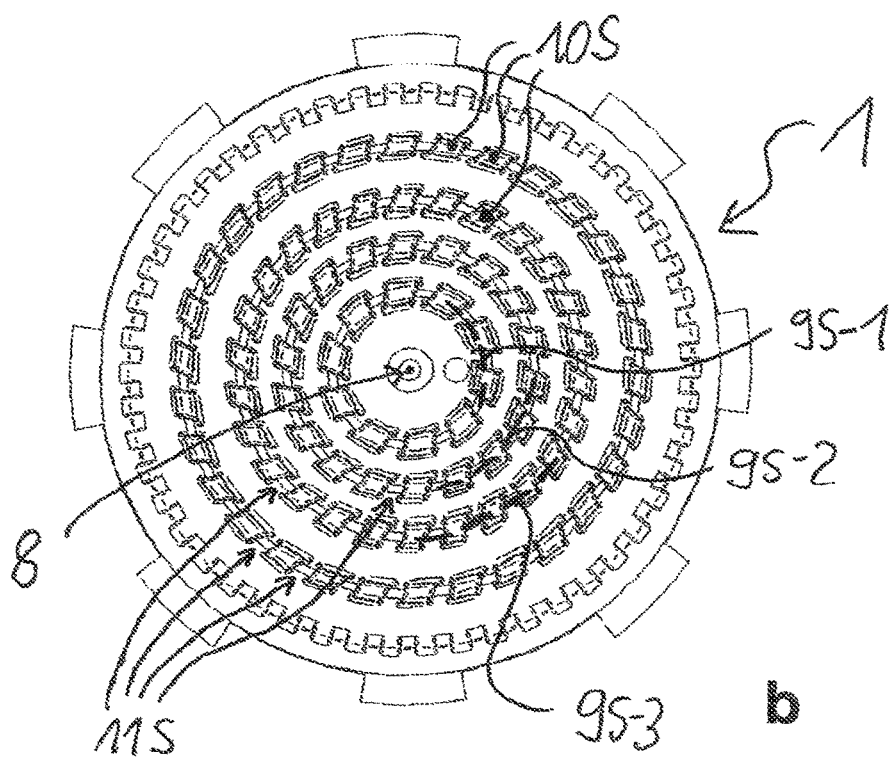

FIG. 3 a plan view (in the direction of the axis of rotation) onto the rotor (FIG. 3a) and the stator (FIG. 3b) according to FIG. 1.

Figure 4A:
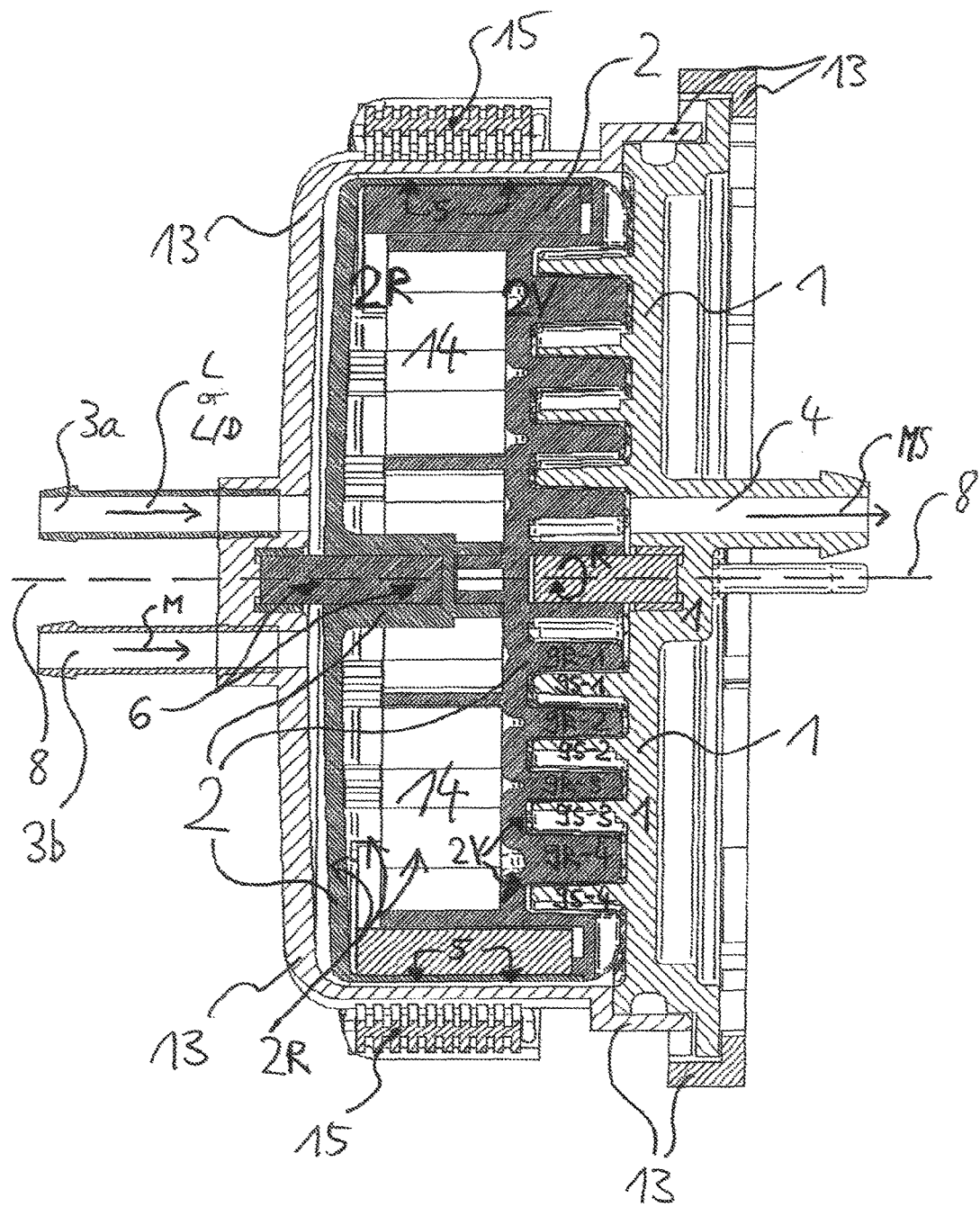

FIG. 4a a section through the axis of rotation of a second milk-frothing device according to the invention.

Figure 4B:
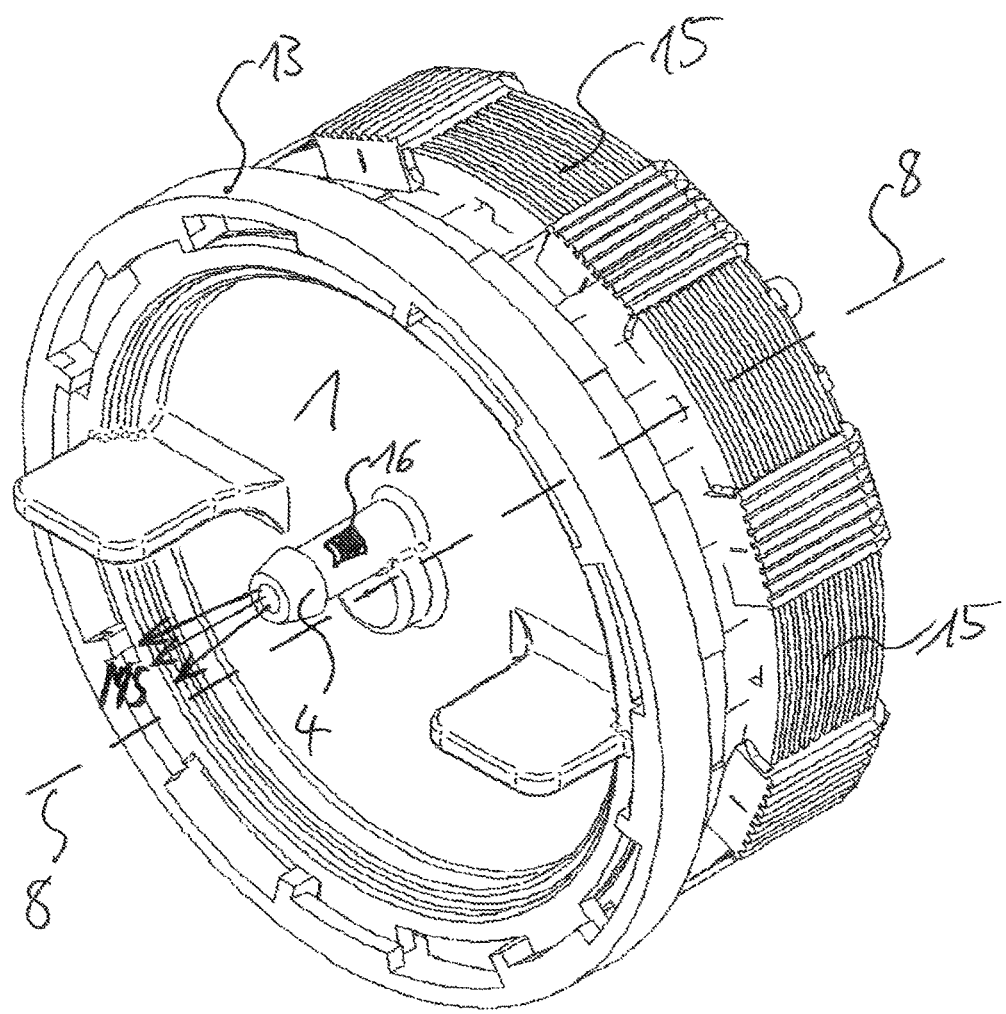

FIG. 4b a three-dimensional plan view onto the milk-frothing device from FIG. 4a.

Figure 5:
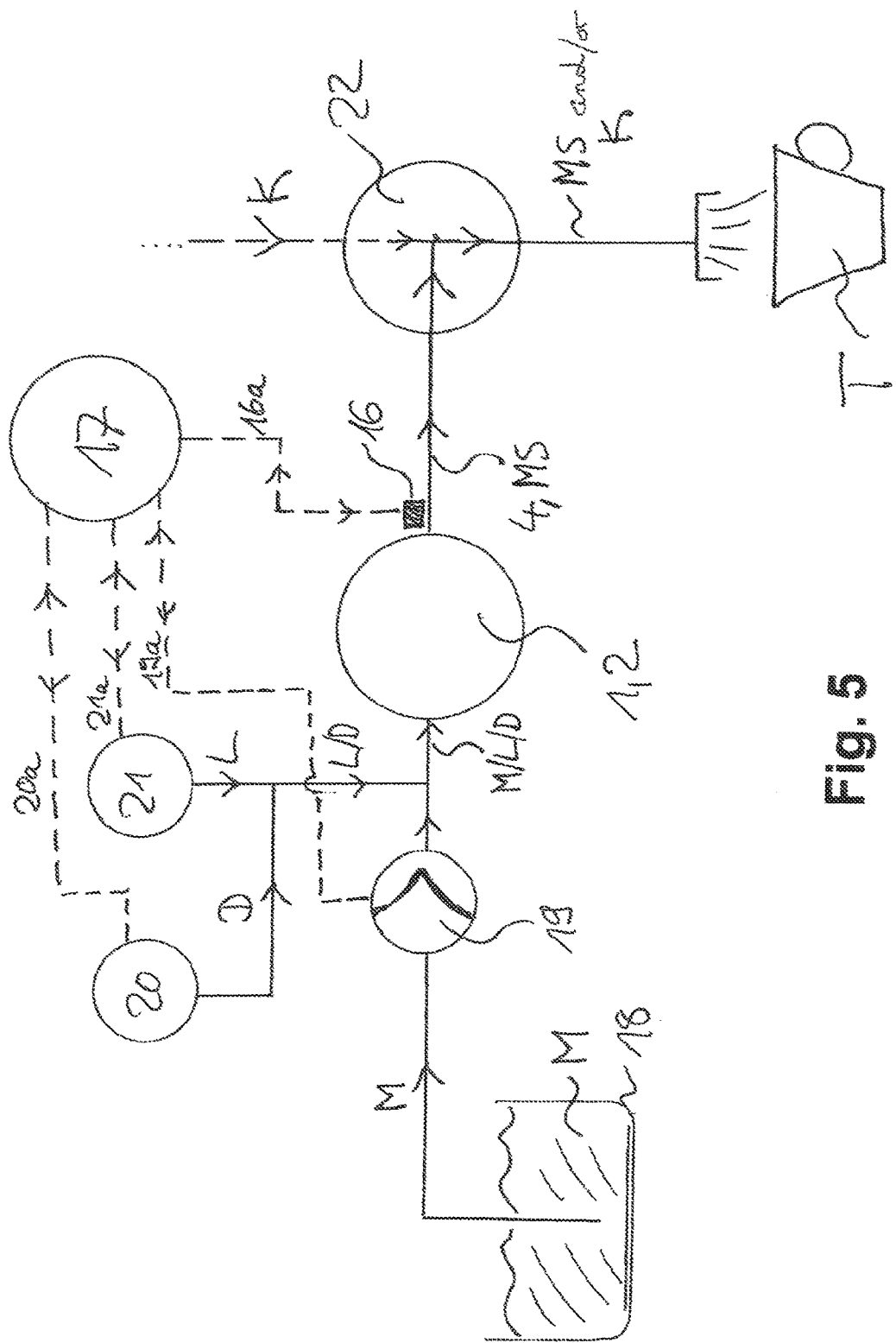

FIG. 5 a drinks preparer according to the invention in the form of a fully automatic coffee machine (merely the essential parts thereof according to the invention are illustrated).

FIG. 1 shows, in cross-section in one plane, through which the axis of rotation 8 of the stator-rotor arrangement extends, a first milk-frothing device according to the invention. FIG. 2a shows a three-dimensional view and FIG. 3a shows a plan view (parallel to the axis of rotation 8) of the rotor 2 of this milk-frothing device. FIG. 2b shows a three-dimensional view and FIG. 3b shows a plan view (parallel to the axis of rotation 8) of the stator 1 of this milk-frothing device.

As FIG. 1 shows, a supply channel 3 comprising two partial channels here leads parallel to the axis of rotation 8, but at a spacing therefrom, directly up to the rear-side surface 2R of a rotor 2. This supply channel 3 serves for supplying milk M and air L or milk M and an air-steam mixture to the rear-side surface 2R of the rotor 2. This rear-side 2R (apart from a gap) is surrounded in a form-fit by a housing portion 7 of the milk-frothing device. The housing portion 7 is connected rigidly to a stator 1 which is positioned on the front-side 2V of the rotor 2 and situated opposite the latter. The stator 1 surrounds the rotor 2 at the front-side 2V thereof, the housing portion 7 surrounds the rotor 2 at the outer circumference 5 thereof orientated away from the axis of rotation 8. Rotor 2 and stator 1 form the essential constructional elements of a dynamic mixing unit. The housing 7 and also the stator 1 connected to the latter surround the rear-side 2R, the outer circumference 5 and also the front-side 2V of the rotor 2 in a form-fit so that the inflowing fluid mixture L, M or L/D, M, as a result of the centrifugal forces of the rotor 2 rotating relative to the stator 1 and to the housing 7, is transported through a narrow gap between housing 7 and rotor rear-side 2R firstly towards the outer circumference 5, then, as a result of the pressure of the fluid L, M or L/D, M which flows subsequently via the supply pipe 3 out beyond the outer circumference 5 of the rotor (through a gap between the outer circumference 5 and the housing portion 7 surrounding the rotor 2), is pressed towards the front-side 2V of the rotor 2 and finally, because of the mentioned pressure between the front-side 2V of the rotor 2 and the surface of the stator 1 situated opposite the front-side 2V of the rotor 2 (i.e. between the shearing elements TOR of the rotor 2, on the one hand, and the shearing elements 10S of the stator 1, on the other hand, see subsequently) flows from the outer circumference 5 of the rotor 2 towards the axis of rotation 8, where said fluid mixture is discharged out of the dynamic mixing unit via a discharge channel 4 extending parallel to the axis of rotation 8. Frothing-up of the inflowing fluid mixture L, M or L/D, M is thereby effected during throughflow of the shearing elements 10R, 10S to form milk froth MS.

The path of the fluid mixture via the supply channel 3, along the rear-side 2R of the rotor 2 from near the centre 6 of the rotor towards the outer circumference 5 of the rotor 2, beyond the outer circumference 5 to the front-side 2V of the rotor 2 through between the shearing elements 10R, 10S and back towards the centre 6 of the rotor and also finally via the discharge channel 4 is characterised in FIG. 1 by arrows (illustrated only for the quantity of fluid flowing past the above-situated outer circumferential side 5). The force to be applied on the front-side 2V of the rotor 2 against the rotation of the rotor 2, in order to press the fluid mixture through the shearing elements 10R, 10S for the frothing-up, is produced by the pressure generated by means of the pump 19 and the compressed air source 21 upstream of the supply pipe portion 3 (cf. FIG. 5). A pressure in the dynamic mixing unit of approx. 600 to 700 mbar is thereby sufficient.

The outer diameter of the stator portion surrounding the rotor 2 on the outer circumferential side is here 7 cm. Housing 7 and stator 1 surround the rotor (apart from the supply pipe 3 and the discharge pipe 4) in a fluid-impermeable manner.

The drive of the rotor 2 in the case of the first milk-frothing device according to the invention, according to FIGS. 1 to 3, is effected via a motor-driven drive shaft 12 rotating about the axis of rotation 8.

FIGS. 2a and 3a show the construction of the rotor 2 of the first milk-frothing device according to the invention or the dynamic mixing unit thereof. The rotor 2 is configured as an essentially flat, rotationally-symmetrical disc which has a diameter of 6.5 cm. On the front-side 2V to be orientated towards the stator 1, this disc has a plurality (here: 3) of series of shear elements 9R (here: series 9R-1, 9R-2 and 9R-3). The direction of rotation of the rotor 2 during rotation about its centre 6 or about the axis of rotation 8 of the dynamic mixing unit is characterised with R (see arrow).

Each series of shearing elements 9R consists of a large number of individual shearing elements 10R which protrude in the form of block-shaped pins from the surface 2V of the rotor 2 (and hence directed towards the stator 1), i.e. are configured as projections. Between directly adjacent shearing elements 10R of one series, respectively gap-shaped through-openings 11R are configured. The individual shearing elements 10R of each series 9R are positioned on a circle about the centre 6. The three series of shearing elements 9R therefore form respectively circular rings of projections which are positioned concentrically about the centre 6 or rotate about the axis of rotation 8 (in the rotating state R). The individual series of shearing elements or circular rings 9R are thereby positioned, viewed from the centre 6 towards the outer circumference 5 of the rotor 2, radially at a spacing from each other such that a series of shearing elements 9S of the stator 1 can engage respectively between two adjacent series of shearing elements 9R of the rotor 2 in a form-fit (apart from a residual, narrow gap with a gap extension of approx. 0.3 mm).

In the case of the stator 1, the series of shearing elements 9S (concentrically about the axis of rotation) and also the shearing elements 10S (projections directed towards the rotor 2) and through-openings 11S of these series are configured analogously to the rotor 2.

In the state assembled to form the finished dynamic mixing unit (cf. FIG. 1), there are hence configured, viewed along the axis of rotation 8, overlapping series of shearing elements 10R of the rotor 2, on the one hand, which are positioned alternately and engaged in each other, and of shearing elements 10S of the stator 1, on the other hand. If the rotor 2 rotates relative to the stator 1, the fluid L, M or L/D, M pressed through from the outer circumference 5 at the front-side 2V of the rotor 2 towards the centre 6 is hence sheared every time it passes through through-openings 11 of a series (for example: of the through-openings 11R of a series of shearing elements 9R of the rotor 2) and flows via the narrow gap towards the directly adjacent series of shearing elements (for example towards the adjacent series of shearing elements 10S of the stator 1). As the comparison of the stator shown in FIGS. 2b and 3b with the rotor shown in FIGS. 2a and 3a shows, a first shearing is hence effected, during the flow from the outer circumference 5 towards the centre 6, during crossing from the through-openings 11S of the outer series of shearing elements 9S-4 of the stator 1 via the gap between the latter and the outer series of shearing elements 9R-1 of the rotor into the through-openings 11R of the outer series of shearing elements 9R-4 of the rotor 2, subsequently a second shearing is effected upon crossing from the outer series of shearing elements 9R-4 of the rotor 2 via the gap between the latter and the second-outermost series of shearing elements 9S-3 of the stator 1, thereafter a third shearing is effected upon crossing from the second-outermost series of shearing elements 9S-3 of the stator 1 into the adjacent second-outermost series of shearing elements 9R-3 of the rotor 2 etc.

As FIGS. 2 and 3 show, the number of shearing elements 10R, 10S per series of shearing elements increases in the case of the individual series of shearing elements 9R, 9S from the centre 6 towards the outer circumference 5 both in the case of the rotor 2 and in the case of the stator 1. The individual series or circular rings of shearing elements 9R, 9S have shearing elements 10R, 10S of a slightly different shape (cf. in particular the plan view of FIGS. 3a and 3b), this optimises, on the one hand, the dwell time in the dynamic mixer, on the other hand, it increases the shearing effect and hence ensures, on the one hand, homogenisation and stabilisation of the froth and, on the other hand, the stability of the froth.

Viewed along the circular circumference of the series of shearing elements, the through-openings 11R, 11S of the individual series of shearing elements 9R, 9S have a gap width of approx. 2 mm. As can be detected in FIGS. 3a and 3b (these show the front-side 2V of the rotor 2 in plan view, cf. FIG. 3a, and the side of the stator orientated towards this front-side 2V after assembling the rotor-stator system, cf. FIG. 3b), the fluid through-openings 11R configured between the individual shearing elements 10R of one series of shearing elements 9R of the rotor 2 are directed in opposite directions to the fluid through-openings 11S configured between the individual shearing elements of the respectively adjacent series of shearing elements 9S of the stator 1 (this is detectable in the tilting of the longitudinal axis of the through-openings 11R, 11S, which is directed in the same direction in the case of the rotor 2 and in the case of the stator 1 in FIGS. 3a and 3b, relative to the radial direction from the centre 6 to the outer circumference 5).

The drive of the rotor 2, only indicated here, via the motor-driven shaft 11 allows rotor speeds of rotation between 500 1/min and 7,000 1/min. By varying the rotor speed of rotation within this wide speed of rotation range, the froth quality and froth consistency can be adjusted continuously and very variably.

FIGS. 4a (section in a plane in which the axis of rotation 8 extends) and 4b (three dimensional plan view onto the stator 1 which, together with the housing 13, surrounds the rotor 2, not visible here) show a second milk-frothing device according to the invention. The construction thereof thereby follows basically the construction described for the frothing devices of FIGS. 1 to 3b (the same applies to the mode of operation) so that merely the differences are described subsequently. Identical reference numbers hence denote identical components.

As in FIG. 1 (housing 7), the housing 13 of the dynamic mixing unit surrounds not only the rear-side 2R of the rotor 2 but also the outer circumference 5 thereof. The stator 1 (which is connected rigidly and in a fluid-impermeable manner to the housing 13 surrounding the rotor 2) forms here an essentially disc-shaped plate which is situated opposite the front-side 2V of the rotor and carries the series of shearing elements 9S. The housing 13 and the stator 1 surround the rotor 2 in a fluid-impermeable manner (apart from the opening of the channels 3, 4).

On the rear-side 2R of the rotor 2, offset radially outwards from the centre 6 of the rotor or from the axis of rotation 8, in total two individual supply channels 3a, 3b (which extend parallel to the axis of rotation 8) lead from outside, via the housing wall of the housing 13, to the rear-side 2R of the rotor 2. The first supply channel 3a serves for supply of air or an L/D mixture, the second supply channel 3b serves for the supply of milk M into the interior of the dynamic mixing unit. On the front-side 2V of the rotor, the single discharge channel 4 likewise leads from the centre 6, offset slightly radially outwards and also parallel to the axis of rotation through stator body, out of the fluid-impermeable composite of housing 13 and stator 1 to the outside (discharge of the produced milk froth (MS).

The drive of the rotor 2 or the rotation R thereof is effected electromagnetically: for this purpose, a plurality of permanent magnets 14 is integrated on the rear-side 2R of the rotor 2 in this. Viewed along the axis of rotation 8 at the level of the permanent magnets 14, a coil 15 is wound over the housing 13 on the outer circumferential side, which coil can be supplied with electrical current. The construction and also the arrangement of the coil 15 and of the permanent magnets 14 is such that an electric motor rotary drive is produced.

The variant shown in FIGS. 4a and 4b has the advantage that sealing problems of the motor-driven shaft (cf. FIG. 1), possibly occurring after long operational duration, can be avoided.

As can be detected in FIG. 4b, a temperature sensor 16 is positioned on the discharge channel 4 of the dynamic mixing unit and is connected to a control- and regulating unit 17 of the milk-frothing device (cf. FIG. 5).

The variant shown in FIGS. 4a and 4b also has the advantage that steam D can be conducted at a high temperature (up to 100° C.) via the first supply channel 3a, for disinfection via the flow path L or L/D into the interior of the rotor-stator system, an inflow of cleaning solution being able to be effected at the same time via the second supply channel 3b. Simultaneous rotation R of the rotor 2 hence enables optimum cleaning: chemical cleaning by means of high temperature with simultaneous mechanical cleaning by rotation.

FIG. 5 shows an electrically operated coffee machine (fully automatic coffee machine) according to the invention with integrated milk-frothing device according to FIGS. 1 to 3 or according to FIGS. 4a and 4b. Only the essential features according to the invention of the fully automatic coffee machine are thereby shown.

Milk M taken from an external container 18 is suctioned in via a supply pipe by a pump 19 of the fully automatic machine. Downstream of the pump 19, an air- or air-steam supply pipe opens into the fluid supply path on the output side of the pump leading towards the dynamic mixing unit 1, 2. The latter corresponds to the supply channel 3 in FIG. 1. If the dynamic mixing unit 1, 2 of FIGS. 4a, 4b is used (not shown here), then no upstream uniting of the air- or air-steam flow with the milk flow is effected, but rather the air L or L/D mixture is conducted via the first supply channel 3a and the milk M is conducted via the pump output side of the pat, which opens into the second supply channel 3b, into the dynamic mixing unit 1, 2.

The air- or air-steam supply is effected as follows: for air supply, the fully automatic coffee machine comprises a compressed air source 21, via which the air L can be conducted into the pipe between pump 19 and dynamic mixing unit 1, 2. Upstream of the corresponding opening, a steam pipe opens into this air supply pipe, at the upstream end of which a hot steam source 20 is situated. Via the steam pipe, an optional steam component D can be added to the compressed air L (by means of which the result is not only frothing in the mixing unit 1, 2 by means of multiple shearing but also heating of the milk froth MS to be dispensed). Optionally (or alternatively to the steam source 20), also a heating unit (not shown here) can be provided, with which heating unit the dynamic mixing unit (preferably the stator 1 of the same) can be heated.

The discharge channel 4 of the dynamic mixing unit 1, 2 for discharging the milk froth MS leads into a dispensing head 22 of the fully automatic coffee machine which is configured to dispense both the milk froth MS and the prepared coffee K (coffee-making unit not shown here) into an external cup T. A temperature sensor 16 is positioned on the discharge channel 4 (cf. FIG. 4b).

A central control- and regulating unit 17 controls production and dispensing of the milk froth MS (and also the remaining functions of the fully automatic coffee machine), as follows: bi-directional control- and data lines 16a, 19a, 20a and 21a connect the central control- and regulating unit 17 to the temperature sensor 16, to the pump 19, to the steam source 20 and to the compressed air source 21. In addition, the unit 17 (not shown here) for controlling the speed of rotation of the rotor is connected to the dynamic mixing unit 1, 2.

The unit 17 firstly controls the ratio of steam D and L of the L/D mixture which is added to the milk M. Thus, for example if it is detected via the temperature sensor 16 that the temperature of the milk froth MS is too low, the proportion of steam L) relative to the proportion of air L in the L/D mixture can be increased. The quantity of supplied L/D mixture relative to the quantity of milk M suctioned in via the pump 19 can be regulated via the speed of rotation of the pump 19: increasing the speed of rotation of the pump increases the conveyed quantity of the pump 19 and hence the proportion of milk M in the mixture of air L, steam D and milk M. Also complete switching off of the steam source 20 via the line 20a is possible so that cold milk froth MS can be produced and dispensed. 22 (after cooling the milk M in the external container 18).

Alternatively to the basic construction shown in FIG. 5, the pump 19 can also be positioned, after the opening of the L/D pipe, into the supply pipe to the mixing unit 1, 2. Instead of heating the milk M via steam D, the steam source 20 can also be omitted: instead, a flow heater can be positioned between pump 19 and mixing unit 1, 2.

The invention claimed is:
1. A milk-frothing device, comprising:
a dynamic mixing unit having a stator,
the stator having a series of shearing elements,
the dynamic mixing unit having a rotor that is rotatable relative to the stator,
the rotor having a series of shearing elements that engage intermittently with the shearing elements of the stator,
the rotor and the stator being configured to:
conduct milk and air to the dynamic mixing unit,
froth the milk and the air in the dynamic mixing unit,
subject the frothed milk and air multiple times to a shearing effect caused by rotation of the rotor relative to the stator such that rotation of the rotor relative to the stator is configured to shear and change direction of milk and air flowing between one series of shearing elements of the rotor and a directly adjacent series of shearing elements of the stator, and
discharge the frothed and sheared milk and air out of the dynamic mixing unit.

2. The milk-frothing device according to claim 1, wherein the rotor and the stator are further configured to:
subject the frothed milk and air multiple times to the shearing effect when the frothed milk and air flow from an outer circumference of the rotor to a center of the rotor by rotation of the rotor relative to the stator.

3. The milk-frothing device according to claim 1,
wherein the rotor is surrounded on its outer circumference side by the stator and by a housing which houses the rotor and is stationary relative to the stator; and
wherein the rotor and the stator are configured to:
conduct the milk and the air to a rear-side of the rotor,
direct the milk and the air from the rear-side of the rotor, via centrifugal forces effected by rotation of the rotor, towards the outer circumference of the rotor,
direct the milk and the air are from the outer circumference of the rotor, by the stator and/or of the housing and also flowing past the outer circumference of the rotor, towards a front-side of the rotor,
subject the milk and the air to the multiple shearing effect when flowing from the outer circumference of the rotor to the center of the rotor by the rotation of the rotor, and
discharge the milk and the air are out of the dynamic mixing unit.

4. The milk-frothing device according to claim 1, wherein the rotor and the stator, viewed radially outwards from an axis of rotation of the rotor, have respectively the series of shearing elements which are configured radially at a spacing from each other and with respectively a plurality of shearing elements, the rotor and the stator being positioned relative to each other such that, viewed along the axis of rotation, the shearing elements of the rotor and overlap with the shearing elements of the stator at least in portions and such that, viewed from the axis of rotation radially outwards, the series of shearing elements of the rotor alternate with the series of shearing elements of the stator.

5. The milk-frothing device according to claim 4, wherein for the series of shearing elements of the rotor and the series of shearing elements of the stator, which is directly adjacent radially thereto, and for all such pairs of radially directly adjacent series of shearing elements of the rotor and of the stator, through-openings for milk and air, which are configured between the individual shearing elements of the series of shearing elements of the rotor, are directed in opposite directions to through-openings for milk and air, which are configured between the individual shearing elements of the series of shearing elements of the stator.

6. The milk-frothing device according to claim 1, wherein a maximum radial extension of the rotor or of the stator is between 2 cm and 15 cm.

7. The milk-frothing device according to claim 1, wherein the rotor is capable of being rotated, relative to the stator, at a speed of rotation between 500 revolutions per minute and 7,000 revolutions per minute.

8. The milk-frothing device according to claim 1, wherein a drive of the rotor is via a motor-driven shaft.

9. The milk-frothing device according to claim 1, further comprising:

a housing that encapsulates the rotor;

at least one permanent magnet fixed in or on the rotor; and at least one coil fixed in or on the housing and capable of being supplied with electrical current for driving the rotor.

10. The milk-frothing device according to claim 1, further comprising:

at least one supply channel configured for supplying the milk and the air into the dynamic mixing unit, the at least one supply channel being oriented, at least in portions, parallel to an axis of rotation of the rotor.

11. The milk-frothing device according to claim 10, further comprising:

a control unit having one or more of the following characteristic parameters of the milk-frothing device is/are adjustable:

speed of rotation of the rotor, quantity of milk supplied to the dynamic mixing unit per unit of time, quantity of air or quantity of air-steam mixture supplied to the dynamic mixing unit per unit of time, mixing ratio of air and steam of an air-steam mixture supplied to the dynamic mixing unit, or temperature of the steam in an air-steam mixture supplied to the dynamic mixing unit.

12. The milk-frothing device according to claim 11, further comprising:

a temperature sensor configured to detect a temperature of the frothed-up milk discharged out of the dynamic mixing unit is detected, wherein the control unit is a control- and regulating unit, with which, using the temperature of the frothed-up milk detected with the temperature sensor, one or more of the following characteristic parameters of the milk-frothing device is/are regulatable:

speed of rotation of the rotor, quantity of milk supplied to the dynamic mixing unit per unit of time, quantity of air or quantity of air-steam mixture supplied to the dynamic mixing unit per unit of time, mixing ratio of air and steam of an air-steam mixture supplied to the dynamic mixing unit, or temperature of the steam in an air-steam mixture supplied to the dynamic mixing unit.

13. The milk-frothing device according to claim 12, wherein the temperature sensor is disposed in or on the discharge channel.

14. The milk-frothing device according to claim 1, wherein the dynamic mixing unit is configured to be heated.

15. The milk-frothing device of claim 1, further comprising:

a drinks preparer configured to prepare hot drinks.

16. The milk-frothing device according to claim 1, further comprising:

a discharge channel configured to discharge the frothed and sheared milk and air out of the dynamic mixing unit, the discharge channel being oriented, at least in portions, parallel to an axis of rotation of the rotor.

17. The milk-frothing device according to claim 1, wherein the stator is configured to be heated.

\* \* \* \* \*